No. 647,693. Patented Apr. 17, 1900.
C. H. BLANTZ.
HOSE COUPLING.
(Application filed Oct. 3, 1898.)

(No Model.)

On line x-x

WITNESSES:
J. B. Malnati
O. H. Hoover

INVENTOR
Clayton H. Blantz
BY

ATTORNEY.

UNITED STATES PATENT OFFICE.

CLAYTON H. BLANTZ, OF LEBANON, PENNSYLVANIA.

HOSE-COUPLING.

SPECIFICATION forming part of Letters Patent No. 647,693, dated April 17, 1900.

Application filed October 3, 1898. Serial No. 692,577. (No model.)

*To all whom it may concern:*

Be it known that I, CLAYTON H. BLANTZ, a citizen of the United States, residing in the city of Lebanon, in the county of Lebanon, in the State of Pennsylvania, have invented a new and useful Hose-Coupling, of which the following is a full and correct description.

The invention relates generally to pipe-couplings, and particularly to those classes of couplings in which a clamp or analogous appliance is employed to secure the ends of sections of tubing upon an inclosed coupling-joint of metal, wood, or other hard and inflexible material.

The essential novelty involved in the invention consists in the peculiar formation of the clamping-ring or securing-ring which is applied upon the hose as it encircles the coupling-joint, to secure the same rigidly but detachably together, as will appear from the following description thereof.

Figure 1:
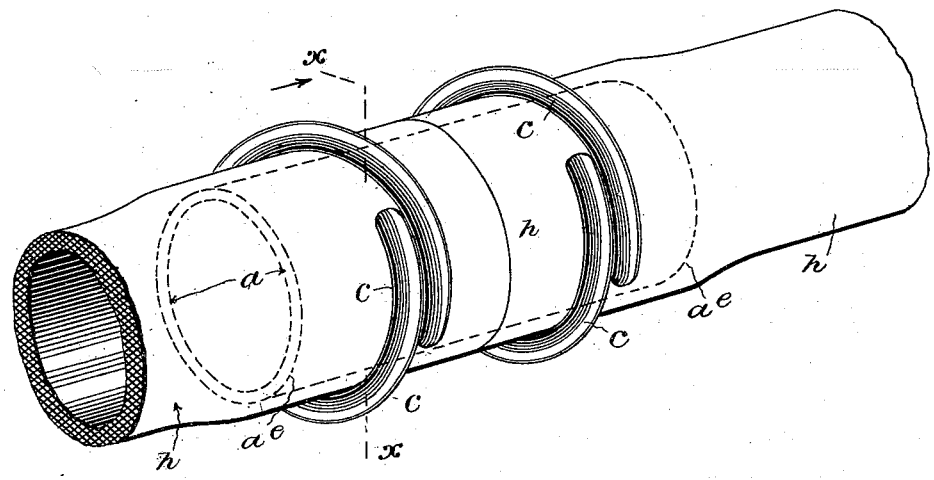
Figure 2:
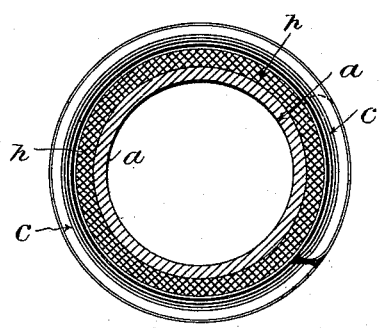
Figure 3:
Figure 3:

In the accompanying drawings, which constitute a part of this specification, Figure 1 represents a side perspective elevation showing two sections of hose sleeved upon a coupling-joint and having my novel open securing-ring encircling such hose and joint. Fig. 2 represents a transverse section as in the line $x\ x$ of Fig. 1. Fig. 3 represents a transverse section showing a slightly-modified form of the metallic bar or rod of iron of which the ring is formed.

The ends $ae\ ae$ of the coupling-joint $a$ will preferably be screw-threaded or otherwise roughened in an ordinary manner. The clamping-ring or securing-ring $c$ will ordinarily be composed of a fragment of iron rod, which may be circular in cross-section or which may in transverse section be of the form represented in Fig. 3, the fragment being bent around a metallic or other former of a diameter corresponding to the diameter of the hose $h$, and the length of the fragment or section of the rod or bar being by preference somewhat greater than the circumference of the hose.

In assembling the parts the securing-rings $c\ c$ are first slipped upon the hose $h$ and moved to a point several inches distant from the ends of the same. The ends of the coupling-joint $a$ are then inserted within the ends of the hose, and the open securing-rings $c$ are then by light blows of a hammer forced along the hose until they encircle both the hose and the coupling-joint and bind the former rigidly upon the latter. In this example of the invention the coupling-joint is composed of iron of ordinary quality and has a diameter of one and one-fourth inches. The hose, which is of rubber, has a diameter of one and five-eighth inches, and the securing-ring is formed from three-eighth-inch round iron and is of a length about one-third to one-half greater than the circumference of the hose, so that the ends lap past each other at their sides; but of course I do not restrict myself to these dimensions or to these precise proportions. It is important, however, that the ring shall have sufficient flexibility to permit it to yield and expand somewhat under the blows of a hammer, and be thus slightly enlarged to accommodate itself to the greater dimensions of the end of the hose at the point where it is stretched upon the coupling-joint and sufficient stiffness to maintain the hose rigidly in its position upon the coupling-joint.

It will be perceived that the overlap or prolongation of the ends of the rings beyond the point at which the circle is completed insures increased holding power without essentially increasing the cost of the ring.

It will probably be desirable in some instances to make the rings from rods of iron which in transverse section are of the form represented in Fig. 3—that is to say, in which the engaging surface of the ring shall be flattened, while the outer surface is rounded, as shown, the advantage being that the broader surface engages with greater friction without diminishing the strength and stiffness of the ring.

The invention having been thus described, what is claimed is—

1. As a means for securing a section of hose in place upon its coupling-joint, the described open, wrought-iron ring, having flexibility, to permit it to be slightly expanded as it is moved longitudinally along the hose, to its securing position; having stiffness or rigidity, to enable it to clasp the hose with sufficient firmness to maintain it in place; and having its ends overlapped and lying side by side upon the hose.

2. As a means for securing a section of hose in position upon a coupling-joint, an open ring, of wrought-iron, having a flattened inner surface, for engaging the hose, an outwardly-rounded body, for insuring strength, and oppositely-extending ends which rest side by side upon the body of the hose.

In testimony whereof I have hereunto, on this 10th day of September, 1898, affixed my signature in presence of two subscribing witnesses.

CLAYTON H. BLANTZ.

Witnesses:
GEO. W. LONG,
THOS. J. SCHAAK.